US008782955B2

(12) United States Patent
Mori et al.

(10) Patent No.: US 8,782,955 B2
(45) Date of Patent: Jul. 22, 2014

(54) SEALING STRUCTURE OF WEATHER STRIP FOR RETRACTABLE ROOF VEHICLES

(75) Inventors: Kousuke Mori, Hiroshima (JP); Hirofumi Ogawa, Hiroshima (JP); Shinya Murakami, Machida (JP)

(73) Assignee: Nishikawa Rubber Co., Ltd., Hiroshima-Shi, Hiroshima-Ken (JP)

( * ) Notice: Subject to any disclaimer, the term of this patent is extended or adjusted under 35 U.S.C. 154(b) by 29 days.

(21) Appl. No.: 13/299,024

(22) Filed: Nov. 17, 2011

(65) Prior Publication Data

US 2012/0159861 A1 Jun. 28, 2012

(30) Foreign Application Priority Data

Dec. 22, 2010 (JP) ................................. 2010-285895

(51) Int. Cl.
*E06B 7/26* (2006.01)

(52) U.S. Cl.
USPC .......... 49/476.1; 49/502; 49/479.1; 49/484.1; 49/441

(58) Field of Classification Search
USPC ............... 49/502, 476.1, 479.1, 475.1, 484.1, 49/440, 441, 348, 349; 296/146.14, 296/146.16
See application file for complete search history.

(56) References Cited

U.S. PATENT DOCUMENTS

| | | | | |
|---|---|---|---|---|
| 2,451,399 | A * | 10/1948 | Martin | 296/154 |
| 4,697,386 | A * | 10/1987 | Watanabe et al. | 49/374 |
| 5,105,580 | A * | 4/1992 | Akachi et al. | 49/476.1 |
| 5,269,101 | A * | 12/1993 | Nozaki et al. | 49/479.1 |
| 5,655,333 | A * | 8/1997 | Yamashita | 49/441 |
| 6,395,355 | B1 * | 5/2002 | Nakajima et al. | 428/34.1 |
| 6,422,639 | B1 * | 7/2002 | Hemauer | 296/146.5 |
| 6,598,347 | B2 * | 7/2003 | Hattori | 49/479.1 |
| 6,931,790 | B2 * | 8/2005 | Tsuchida | 49/408 |
| 7,178,809 | B2 * | 2/2007 | Kuzuya et al. | 277/631 |
| 7,306,839 | B2 * | 12/2007 | Kubo et al. | 428/122 |

FOREIGN PATENT DOCUMENTS

JP 2010-089694 4/2010

* cited by examiner

*Primary Examiner* — Katherine Mitchell
*Assistant Examiner* — Marcus Menezes
(74) *Attorney, Agent, or Firm* — Robert P. Michal; Lucas & Mercanti LLP

(57) ABSTRACT

A sealing structure, of which an upper end part makes elastic contact with a roof weather strip which is installed along a side edge of a roof and extending in a front and rear direction, includes an installation base member installed on a quarter sash provided on a front side of a quarter window glass of a retractable roof vehicle, (that lifts and lowers together with the quarter window glass). The sealing structure also includes a hollow seal part which makes elastic contact with a side window glass, and a seal lip, An upper end part has a seal wall formed thereon, which covers a front side corner part of the upper end part from an inner-cabin side, which is protrudingly formed toward an outer-cabin side and makes elastic contact with the side window glass from an inner-cabin side.

2 Claims, 6 Drawing Sheets

SEALING STRUCTURE OF WEATHER STRIP FOR RETRACTABLE ROOF VEHICLES

This application claims the benefit under 35 USC 119 of JP Patent Application JP 2010-285895 filed Dec. 22, 2010, the entire disclosure of which is incorporated herein by reference.

BACKGROUND OF THE INVENTION

The present invention relates to a sealing structure of weather strips for retractable roof vehicles. More specifically, the present invention relates to the sealing structure of the weather strips, which are installed along front edges of quarter window glasses that open and close, for the retractable roof vehicles of which roofs that open and close are folded and put away in storages.

FIG. 4 is an external view of one type of retractable roof vehicles of which roofs that open and close are folded to open. The roof comprises a soft top 1 which is folded and put away in a trunk 2 on a lower rear side of a vehicle. Another roof of the retractable roof vehicle comprises a roof panel and a back window panel at the back of the roof panel instead of the soft top 1, which are folded and put away in the trunk 2 while the roof panel as folded is piled on the back window panel. Such vehicles are generally called retractable hard top, coupe cabriolet or coupe convertible.

Some of the retractable roof vehicles comprise a quarter window glass 4 that lifts and lowers to close and open on a rear side of a side window glass 3 that lifts and lowers. As shown in FIG. 5 and FIG. 6, the quarter window glass 4 has a quarter sash 5 installed on a front side thereof. The quarter sash 5 has an installation base member 11 of a weather strip 10 installed thereon which extends in a vertical direction with respect to the quarter sash 5. As the quarter window glass 4 lifts or lowers, the weather strip 10 also lifts or lowers. While the quarter window glass 4 is closed, an upper end part of the weather strip 10 makes elastic contact with a roof weather strip 20 installed along a side edge of a soft top 1. The weather strip 10 comprises a hollow seal part 12 which makes elastic contact with a rear end part 3*a* of a side window glass 3 and a seal lip 13 which makes elastic contact with an inner-cabin side surface of the side window glass 3 for securing sealing property inside and outside of the vehicle (see, for example, Japanese unexamined Patent Publication No. 2010-89694).

According to the sealing structure for retractable roof vehicles according to the prior art, the upper end part of the weather strip 10 makes elastic contact with the roof weather strip 20 as well as the side window glass 3 and therefore the weather strip 10 bends. Such a structure has caused a problem shown in FIG. 7 that water 130 of rain which flows along a side edge of the soft top 1 or of high pressure water of car washing directly powered advances to a space between the side window glass 3 and the weather strip 10 from the outer-cabin side, enters the inner-cabin side and causes water leak.

The Japanese unexamined Patent Publication No. 2010-89694 discloses to form a drainage hole on a position which is lower than an upper end part of a weather strip 20 and in a domain which is open to an inner-cabin side for preventing entrance of trash or dust as well as for draining water. Such a structure necessitates formation of the drainage hole or an outer-cabin side drainage path connected to the drainage hole and is complicated.

Therefore, an object of the present invention is to provide the sealing structure of the weather strips for the retractable roof vehicles, which is simple in structure and capable of preventing the rainwater or the like from entering the inner-cabin side from the upper end part of the weather strips installed along the quarter window glasses that open and close.

SUMMARY OF THF INVENTION

In order to achieve the above-mentioned object, a first aspect of the invention provides a sealing structure of a weather strip (10) for retractable roof vehicles, of which die molded upper end part (101) makes elastic contact with a roof weather strip (20) which is installed along a side edge of a roof (1) and extending in a front and rear direction of a vehicle, said weather strip comprising: an installation base member (11) installed on a quarter sash (5) provided on a front side of a quarter window glass (4) of a retractable roof vehicle, that lifts and lowers together with said quarter window glass (4); a hollow seal part (12) integrally molded with said installation base member (11), which makes elastic contact with a rear end part (3*a*) of a side window glass (3); and a seal lip (13) integrally molded with said installation base member (11) on a front side of said hollow seal part (12), which makes elastic contact with an inner-cabin side surface of said side window glass (3), wherein:

said die molded upper end part (101) has a seal wall (30) formed thereon, which covers a front side corner part (110) of said upper end part (101) from an inner-cabin side, is protrudingly formed toward an outer-cabin side and makes elastic contact with said side window glass (3) from an inner-cabin side.

A second aspect of the invention provides the sealing structure of the weather strip for retractable roof vehicles according to the first aspect of the invention, wherein: a peripheral edge on an outer-cabin side of said seal wall (30) is lengthened downward from an upper side in a diagonally frontward direction and is connected to an upper end of said seal lip (13).

A third aspect of the invention provides the sealing structure of the weather strip for retractable roof vehicles according to the first aspect of the invention, wherein: a peripheral edge (31) on an outer-cabin side of said seal wall (30) is lengthened downward from an upper side in a diagonally frontward direction and is extended to an inside of a position lower than an upper end of said seal lip (13) by certain distance; and the upper end of said seal lip (13) is separate from said seal wall (30) in a front direction of the vehicle.

Symbols in parentheses show constituents or items corresponding to Figures and DESCRIPTION OF PREFERRED EMBODIMENT.

According to the sealing structure of the weather strip for retractable roof vehicles according to the first aspect of the present invention, in the weather strip which lifts and lowers together with the quarter window glass and comprises the hollow seal part and the seal lip which make elastic contact respectively with the rear end part and the inner-cabin side surface of the side window glass, the die molded upper end part has the seal wall formed thereon, which covers the front side corner part of the upper end part, is protrudingly formed toward the outer-cabin side and makes elastic contact with the side window glass from the inner-cabin side. Accordingly, in case the water of rain which flows along the side edge of the roof or high pressure water of car washing directly powered advances to a space between the side window glass and the upper end part of the weather strip from the outer-cabin side, the water that advances to the space is dammed up inside the seal wall or is guided inside the seal lip, which is a space between the hollow seal part and the seal lip, along the peripheral edge on the outer-cabin side of the seal wall.

Such a simple structure prevents the rainwater or the like from entering the inner-cabin side, which advances to the space between the upper end part of the weather strip and the side window glass from the outer-cabin side.

According to the second aspect of the invention, since the peripheral edge on the outer-cabin side of the seal wall is lengthened downward from the upper side in the diagonally frontward direction and is connected to the upper end of said seal lip, the water is dammed up inside the seal wall or is guided inside the seal lip without fail along the peripheral edge on the outer-cabin side of the seal wall.

According to the third aspect of the invention, the peripheral edge on the outer-cabin side of the seal wall is lengthened downward from the upper side in the diagonally frontward direction and is extended to the inside of the position lower than the upper end of the seal lip by certain distance and the upper end of the seal lip is separate from the seal wall in a front direction of the vehicle. Accordingly, in case the water which advances to the space between the side window glass and the upper end part of the weather strip from the outer-cabin side climbs over the seal wall, the water is dammed up by the upper end of the seal lip independent from the seal wall and is guided inside the seal lip along the space between the seal wall and the upper end of the seal lip.

The sealing structure according to the third aspect of the invention further reduces amount of the water which enters the inner-cabin side compared with the sealing structure according to the second aspect of the invention.

DESCRIPTION OF PREFERRED EMBODIMENT

Figure 1:
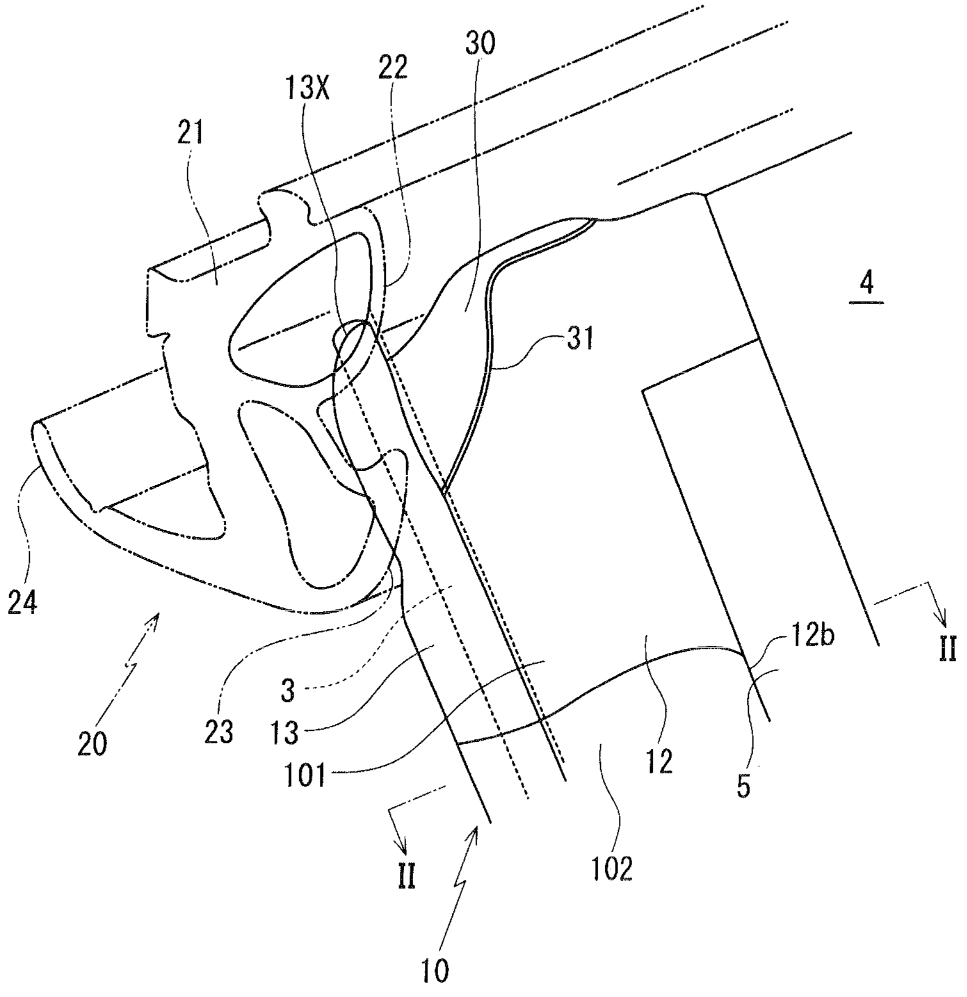
FIG. 1 is a perspective view showing an important part of sealing structure of a weather strip for retractable roof vehicles according to an embodiment of the present invention.
Figure 2:
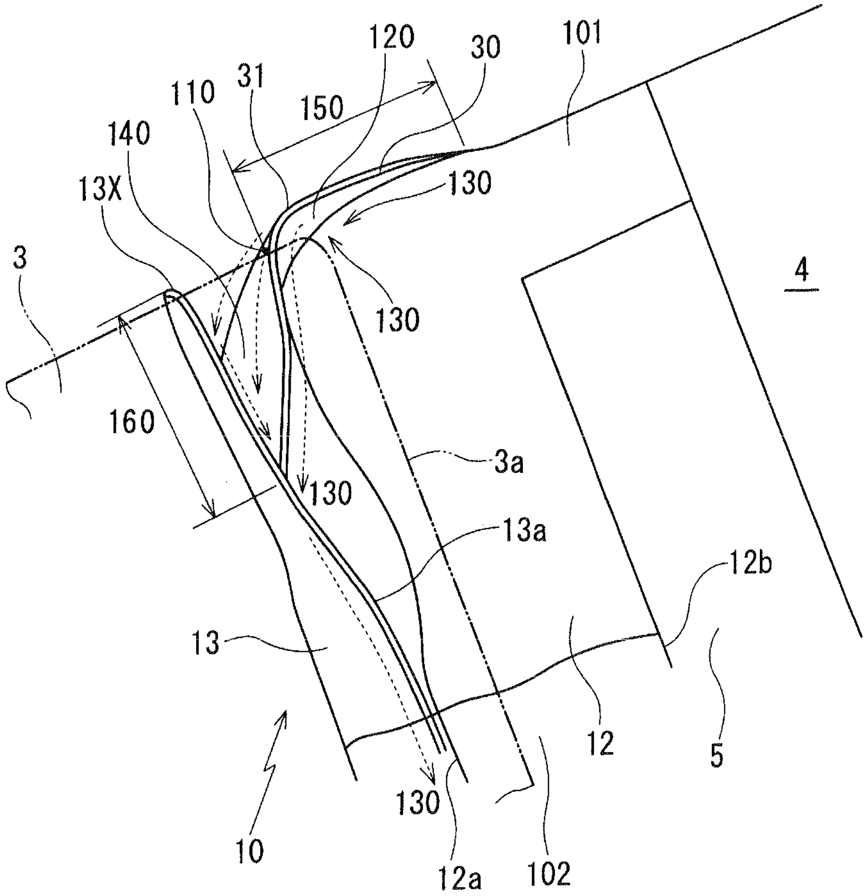
FIG. 2 is a perspective view showing relation between the weather strip and a side window glass of FIG. 1.

Referring to FIG. 1 and FIG. 2, a sealing structure of a weather strip for retractable roof vehicles according to an embodiment of the present invention will be described. FIG. 1 shows an important part of a sealing structure of a weather strip for retractable roof vehicles according to an embodiment of the present invention. FIG. 2 shows relation between the weather strip and a side window glass of FIG. 1. When constituents or items correspond to those in prior arts, the same symbols are used.

Figure 4:
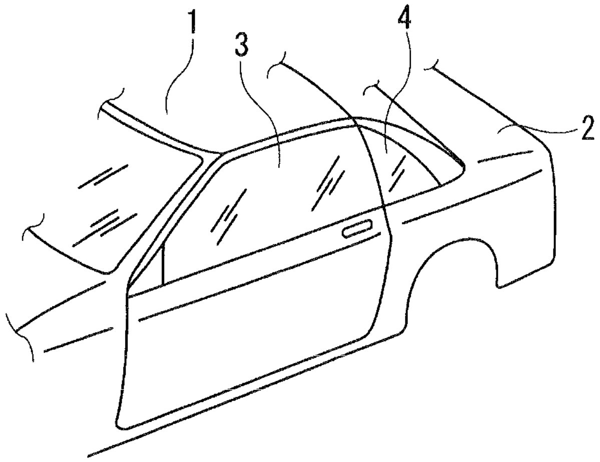
FIG. 4 is an external perspective view of a retractable roof vehicle.

The sealing structure of the weather strip for retractable roof vehicles according to the embodiment of the present invention relates to a sealing structure of a weather strip 10 installed on a quarter window glass 4 that lifts and lowers to close and open in a vehicle shown in FIG. 4, of which a soft top 1 that opens and closes is folded and put away in a trunk 2 on a rear side of the vehicle.

Figure 5:
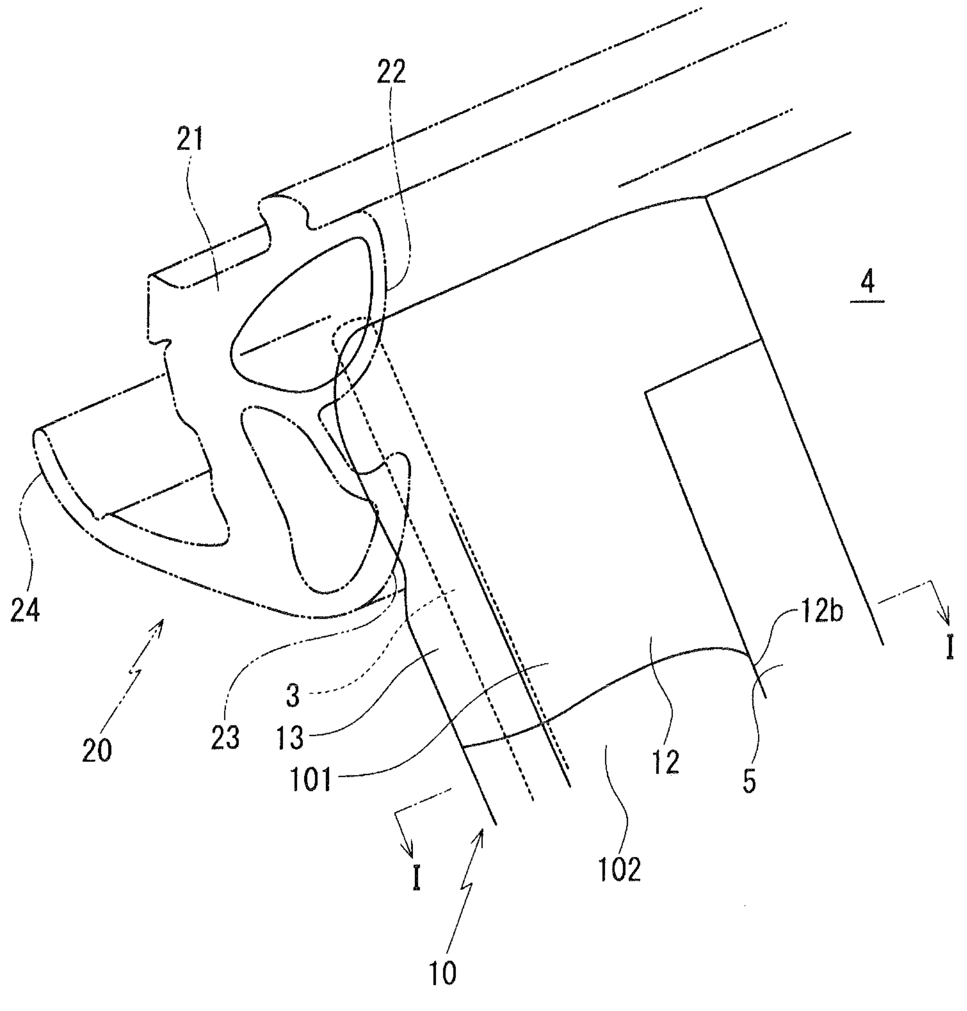
FIG. 5 is a perspective view showing an important part of a sealing structure of a weather strip for retractable roof vehicles according to a prior art.

The weather strip 10 is installed on a front side of a quarter window glass 4 via a quarter sash 5 and extends in a vertical direction of the vehicle. The weather strip 10 comprises an extrusion molded part 102 which has an upper end part 101 and a lower part (not shown) connected respectively on an upper part and a lower part thereof by die molding. It is to be noted that a II-II line enlarged cross section of FIG. 1, showing a structure of the extrusion molded part 102 is the same as FIG. 6 according to a prior art (I-I line enlarged cross section of FIG. 5).

The weather strip 10 mainly comprises: an installation base member 11; a hollow seal part 12; and a seal lip 13. The upper end part 101 has a seal wall 30 formed thereon.

Figure 6:
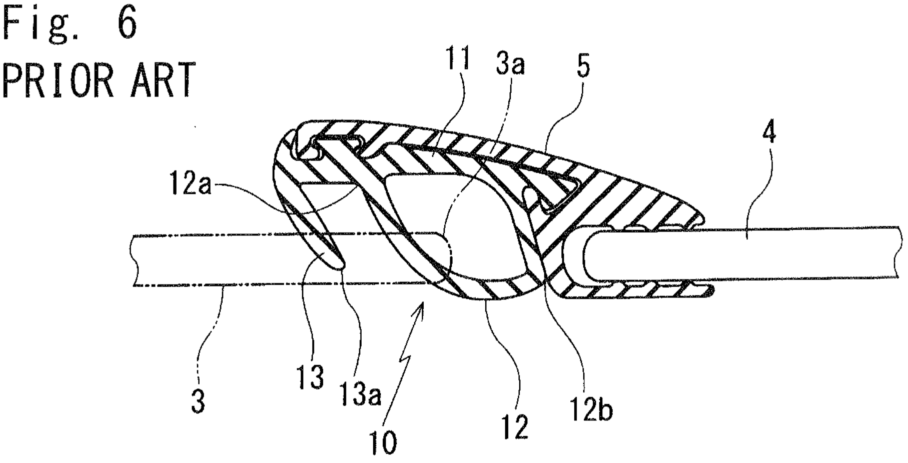
FIG. 6 is a I-I line enlarged cross section of FIG. 5.

As shown in FIG. 6, the installation base member 11 is roughly plate shaped in cross-section, which extends in a front and rear direction of the vehicle and is fit with the quarter sash 5. Shape of the quarter sash 5 or method of fitting the installation base member 11 with the quarter sash 5 is not especially limited as long as the weather strip 10 is installed on the front side of the quarter window glass 4 via the quarter sash 5. The weather strip 10 may be installed via tape or the like.

The hollow seal part 12 is integrally molded with the installation base member 11 in such a manner as to be swelled and curved toward an outer-cabin side from a rough center and a rear part of the installation base member 11. The hollow seal part 12 makes elastic contact with a rear end part of a side window glass 3 when the door is closed.

The seal lip 13 is roughly tongue-shaped in cross section, which is integrally molded with the installation base member 11 in such a manner as to protrude from a front part of the installation base member 11 toward the outer-cabin side. In the same manner as the hollow seal part 12, a top end 13*a* of the seal lip 13 makes elastic contact with an inner-cabin side surface of the side window glass 3 when the door is closed.

As a result, the side window glass 3 is doubly-sealed for the effect of the elastic contact by the hollow seal part 12 and the seal lip 13. Such a structure prevents water 130 from entering the inner-cabin side from the outer-cabin side. In case the water 130 advances to the inner-cabin side from a space between the rear end part 3*a* of the side window glass 3 and the hollow seal part 12, the water 130 is dammed up by the seal lip 13. Accordingly, the water 130 flows down the space between the hollow seal part 12 and the seal lip 13 and is drained outside the vehicle.

The weather strip 10 lifts and lowers together with the quarter window glass 4. When the quarter window glass 4 lifts (is closed), the die molded upper end part 101 of the weather strip 10 makes elastic contact with a roof weather strip 20 which is installed along a side edge of the soft top 1 and extending in a front and rear direction of the vehicle as shown in FIG. 1.

The roof weather strip 20 comprises: an installation base member 21 installed on a retainer (not shown) on the side edge of the soft top 1; an upper hollow seal part 22 which makes elastic contact with upper ends of the side window glass 3 and the quarter window glass 4 as well as an upper end (top end) of the upper end part 101 of the weather strip 10; a side hollow seal part 23 which makes elastic contact with the inner-cabin side surfaces of the side window glass 3 and the quarter window glass 4 as well as the upper end part 101 of the weather strip 10; and a lip 24 which extends toward the inner-cabin side. But shape of the roof weather strip 20 is not especially limited, in which formation of the upper hollow seal part 22 may be omitted or the side hollow seal part 23 may be a cross-section roughly tongue-shaped seal lip.

The upper end part 101 of the weather strip 10 has a seal wall 30 formed thereon. The seal wall 30 covers a front side corner part 110 (extension of a front end 12*a* of the hollow seal part 12 on an extrusion molded part 102) of the upper end part 101 from an inner-cabin side, is protrudingly formed toward an outer-cabin side and makes elastic contact with the side window glass 3 from the inner-cabin side. The seal wall 30 is turned down toward the outer-cabin side to cover the front side corner part 110 from the inner-cabin side. A peripheral edge 31 on the seal wall 30, which is formed by turning down the seal wall 30, is extended from a position away from the front side corner part 110 toward a rear side by distance 150 (extension of a rear end 12*b* of the hollow seal part 12 on the extrusion molded part 102) and is lengthened downward in a diagonally frontward direction via an upper side of the front side corner part 110 to an inside of a position lower than an upper end 13X (roughly the same height as the front side corner part 110) of the seal lip 13 by certain distance 160 (position that is visible from the outside when the soft top 1 is closed). Protruding length of the seal wall 30 is gradually shortened and converged on a lower side position. A lower side position of the peripheral edge 31 on the seal wall 30 may be protruded from the inside of the seal lip 13 to the top end 13*a* of the seal lip 13 toward the outer-cabin side. But the lower side position of the peripheral edge 31 of the present embodiment is recessed toward the inner-cabin side compared with the top end 13*a* of the seal lip 13 to secure a space between the lower side position and the top end 13*a* for the water thus guided to flow down. It is to be noted that the distance 150 and the certain distance 160 of the present embodiment are roughly of the same length (ratio of the distance 150 and the certain distance 160 may vary). Accordingly, the resultant seal wall 30 thus turned down is roughly isosceles-triangular.

The seal wall 30 may be piled and stuck on the upper end part 101 of the weather strip 10 without an opening therebetween. But the seal wall 30 of the present embodiment rises from the upper end part 101 to form an opening 120 between the seal wall 30 and the upper end part 101 which is on the upper side of the front side corner part 110 so that when the rear end part 3*a* of the side window glass 3 makes elastic contact with the seal wall 30, the seal wall 30 bends.

The upper end 13X of the seal lip 13 is tapered in an extension direction and a thickness direction and is separate from the seal wall 30 so that the upper end 13X of the seal lip 13 and the seal wall 30 diverge and form a roughly V-shaped ditch 140 therebetween.

In case the upper end part of the weather strip 10 makes elastic contact with the side window glass 3 as well as the roof weather strip 20 and the weather strip 10 bends, the water 130 of rain which flows along the side edge of the soft top 1 or high pressure water of car washing directly powered may go into a space between the side window glass 3 and the upper end part 101 of the weather strip 10 from the outer-cabin side as shown in FIG. 2. But, according to the sealing structure of the weather strip for retractable roof vehicles according to the embodiment of the present invention, the weather strip 10 has the seal wall 30 formed on the space to which the water 130 advances so that the water 130 that advances to the space is dammed up inside the seal wall 30 or is guided inside the seal lip 13 along the peripheral edge 31 on the outer-cabin side of the seal wall 30.

In addition, in case the water 130 that advances to the space further climbs over the seal wall 30, the water 130 is dammed up by the upper end 13X (which also makes elastic contact with the upper hollow seal part 22) of the seal lip 13 independent from the seal wall 30, and is guided inside the seal lip 13 along the ditch 140 between the seal wall 30 and the upper end 13X of the seal lip 13.

The water 130 thus guided inside the seal lip 13 falls down and is finally drained toward the outside of the vehicle.

Figure 3:
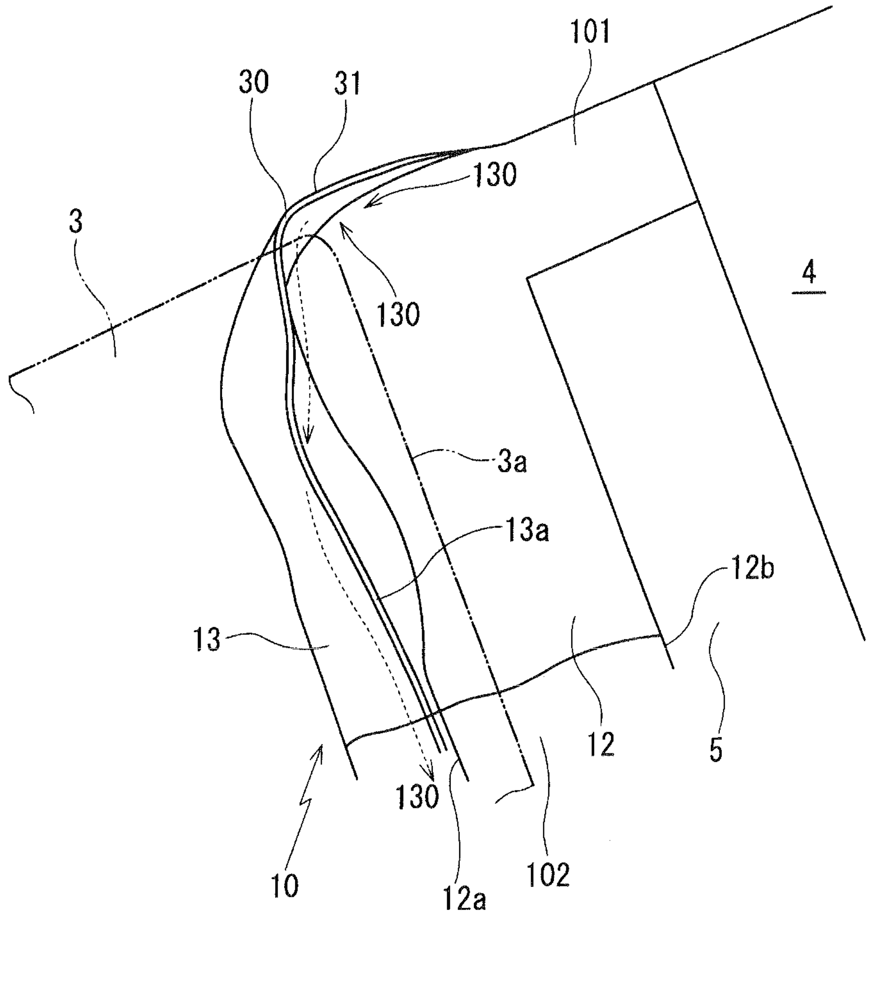
FIG. 3 is a perspective view showing relation between another weather strip and the side window glass for retractable roof vehicles according to the embodiment of the present invention.

While the upper end 13X of the seal lip 13 and the seal wall 30 of the present embodiment diverge and are separate from each other, the peripheral edge 31 on the outer-cabin side of the seal wall 30 may be lengthened downward from the upper side in the diagonally frontward direction and connected to the upper end of the seal lip 13 as shown in FIG. 3.

According to the structure, in case the water 130 of rain which flows along the side edge of the soft top 1 or high pressure water of car washing directly powered advances to the space between the side window glass 3 and the upper end part 101 of the weather strip 10 from the outer-cabin side, the water 130 that advances to the space is dammed up inside the seal wall 30 or is guided inside the seal lip 13 along the peripheral edge 31 on the outer-cabin side of the seal wall 30.

Figure 7:
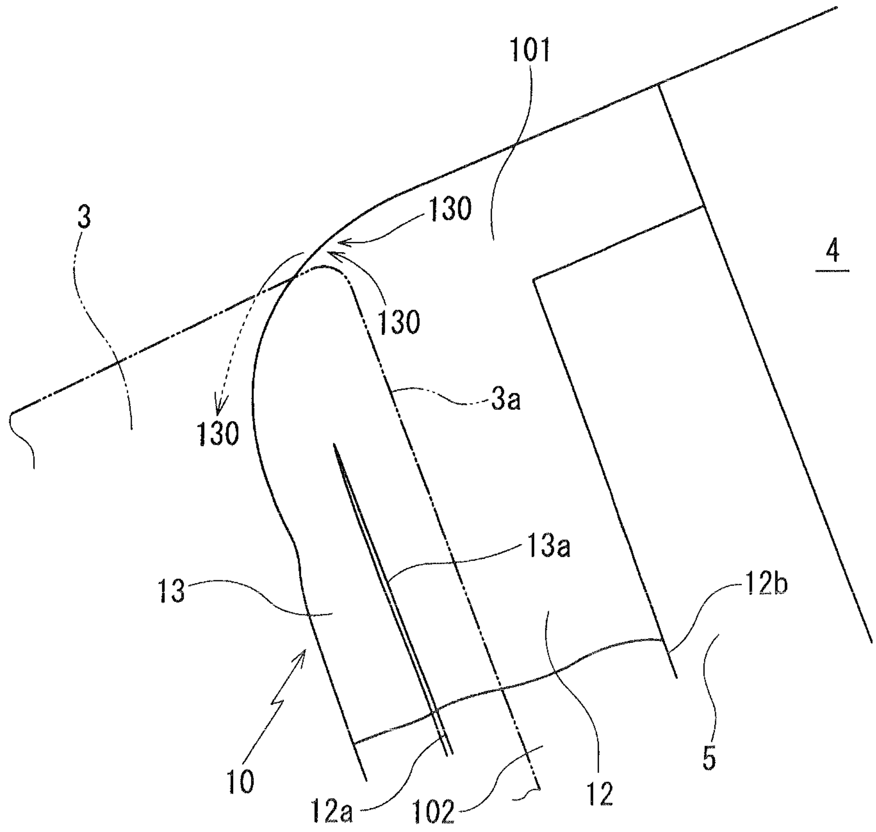
FIG. 7 is a perspective view showing relation between the weather strip and a side window glass of FIG. 5.

In case the water 130 that advances to the space further climbs over the seal wall 30, the water 130 can enter the inner-cabin side to some extent, which is inferior to the above-mentioned embodiment in sealing property. But the sealing structure of the present embodiment is remarkably improved in sealing function compared with the sealing structure according to the prior art (FIG. 7) without the sealing wall 30 and reduces the amount of the water 130 which enters the inner-cabin side.

We claim:

1. A sealing structure of a weather strip for retractable roof vehicles, of which a die molded upper end part makes elastic contact with a roof weather strip which is installed along side edge of a roof, said weather strip comprising: an installation base member operatively coupled on a quarter sash provided on an edge of a quarter window glass of the retractable roof vehicle, that lifts and lowers together with said quarter window glass; a hollow seal part integrally molded with said installation base member, which elastically engages a first edge of a side window glass, the side window glass having first and second surfaces wherein the first surface is disposed toward an interior of the vehicle and the second surface is disposed toward an exterior of the vehicle; and a seal lip integrally molded with said installation base member on a first edge of said hollow seal part, which makes elastic contact with the first surface of said side window glass, in which:

said die molded upper end part has a seal wall formed thereon, which covers said die molded upper end part, and which extends outwardly from an interior of the vehicle toward an exterior of the vehicle, and which makes elastic contact with said side window glass on said first surface of said side window glass; and at least a portion of an upper end of the seal lip separates from the seal wall so that the upper end of the seal lip and the seal wall diverge and form a roughly V-shaped groove therebetween;

the seal wall and a peripheral edge of the seal wall extend to the seal lip at a distance from the upper end of the seal lip, wherein the seal wall rises from the die molded upper end part to form an opening between the seal wall and the die molded upper end part, the opening being disposed along a front side corner part of the die molded upper end part.

2. A sealing structure of a weather strip for retractable roof vehicles, of which a die molded upper end part makes elastic contact with a roof weather strip which is installed along a side edge of a roof, said weather strip comprising: an installation base member operatively coupled on a quarter sash provided on a first edge of a quarter window glass of the retractable roof vehicle, that lifts and lowers together with said quarter window glass; a hollow seal part integrally molded with said installation base member, which elastically engages a first edge of a side window glass, the side window glass having first and second surfaces wherein the first surface is disposed toward an interior of the vehicle and the second surface is disposed toward an exterior of the vehicle; and a seal lip integrally molded with said installation base member on a first edge of said hollow seal part, which makes elastic contact with the first surface of said side window glass, in which:

said die molded upper end part has a seal wall formed thereon, which covers said die molded upper end part, and which extends outwardly from an interior of the vehicle toward an exterior of the vehicle, and which makes elastic contact with said side window glass on said first surface of said side window glass; and at least a portion of an upper end of the seal lip separates from the seal wall so that the upper end of the seal lip and the seal wall diverge and form a roughly V-shaped groove therebetween;

the seal wall and a peripheral edge of the seal wall extend to the seal lip at a distance from the upper end of the seal lip, wherein the seal wall is disposed toward an outer-cabin side from an inner-cabin side, and a peripheral edge on an outer-cabin side of said seal wall, which is formed by turning down the seal wall, is disposed downward in a diagonally frontward direction from a front side corner part which is away from the quarter window glass; wherein the seal wall rises from the die molded upper end part to from an opening between the seal wall and the die molded upper end part, the opening being disposed along a front side corner part of the die molded upper end part.

* * * * *